June 22, 1971 J. JUGLER 3,586,589
ULTRASONIC TOOL AND STAND
Filed July 17, 1969 2 Sheets-Sheet 1

JOHN JUGLER
INVENTOR.

BY:

Erwin B. Steinberg

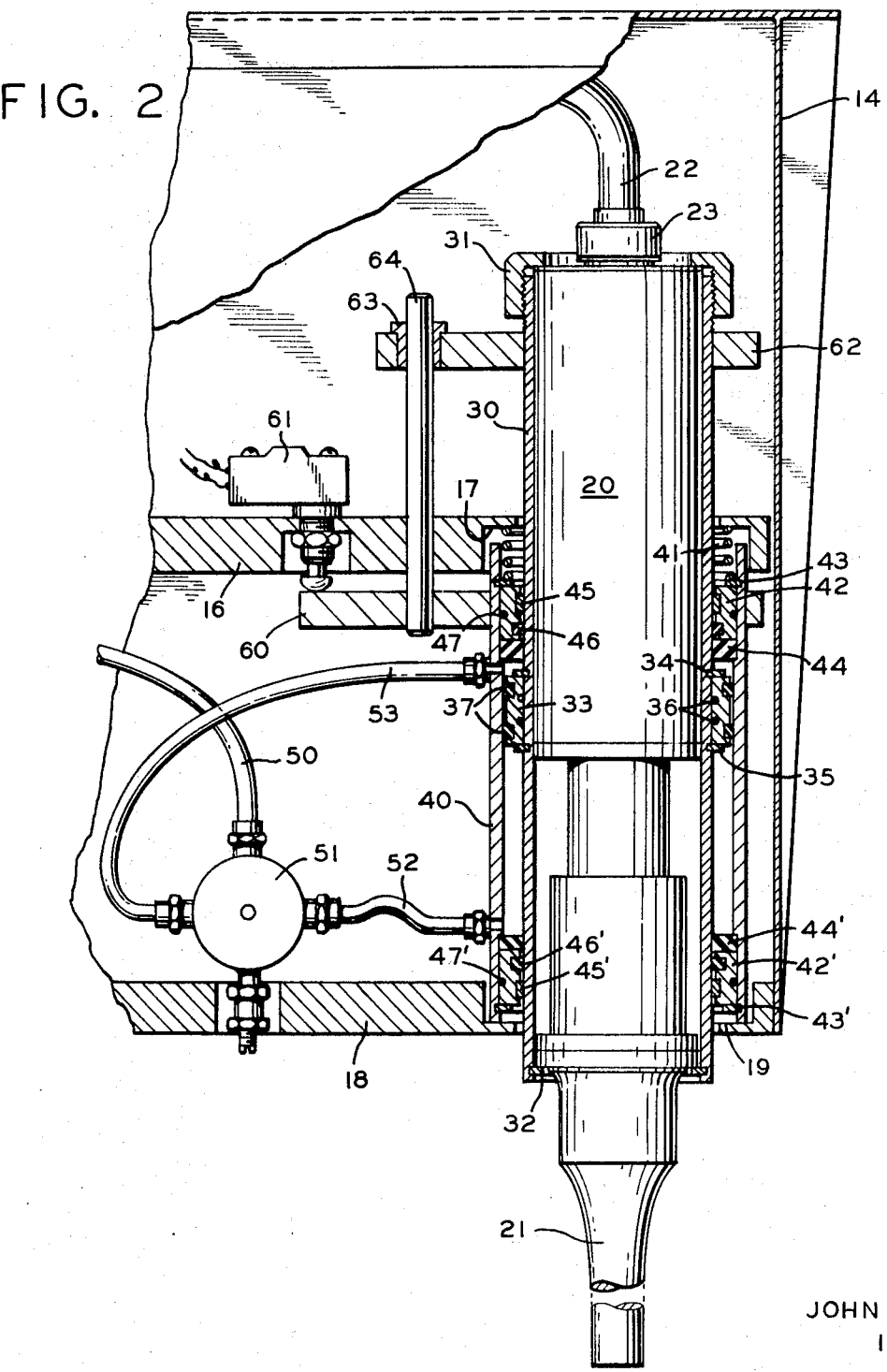

United States Patent Office 3,586,589
Patented June 22, 1971

3,586,589
ULTRASONIC TOOL AND STAND
John Jugler, Danbury, Conn., assignor to Branson Instruments Incorporated, Stamford, Conn.
Filed July 17, 1969, Ser. No. 842,518
Int. Cl. B30b 1/32; B32b 31/16; B29c 27/08
U.S. Cl. 156—580
6 Claims

ABSTRACT OF THE DISCLOSURE

An ultrasonic tool comprises a platform and an upstanding post for supporting the tool. The converter unit furnishing ultrasonic energy to a workpiece is housed within a cylindrical sleeve provided with a ring. The sleeve and ring enclosing the converter unit operate as a piston and are adapted to undergo, responsive to fluid pressure, reciprocating motion within a substantially stationary sleeve.

---

This invention refers to an ultrasonic tool and stand as used for assembling and sealing thermoplastic workpieces. More specifically, this invention has reference to a simplified construction of an ultrasonic tool which is mounted for cyclic reciprocating motion relative to a platform which supports a workpiece receiving ultrasonic energy.

In asesmbling workpieces by means of ultrasonic energy, it is common practice to provide a stationary work station to which workpieces to be assembled by ultrasonic energy are fed. The ultrasonic tool, normally retained at a rest position, is brought into momentary contact with the workpiece for accomplishing the transfer of sonic energy and then is returned to its rest position. The reciprocating motion of the ultrasonic tool can be provided by the use of fluid pressure responsive linear actuators as is shown, for instance, in my copending application for U.S. Letters Patent Ser. No. 607,827, filed Jan. 6, 1967 entitled "Control Circuit for Tool Driven by Sonic Energy," now U.S. Pat. No. 3,493,457 dated Feb. 3, 1970.

The apparatus described hereinafter provides a greatly simplified construction for mounting the ultrasonic tool. Specifically, the ultrasonic tool itself is provided with means for forming a movable piston within a stationary cylinder and reciprocating responsive to fluid pressure. In this manner the complexity and number of individual parts is greatly reduced, but more importantly, the ultrasonic tool being mounted within a substantially stationary cylinder is retained for extremely precise motion along a longitudinal axis, obviating the need for special alignment guides.

One of the principal objects of this invention, therefore, is the provisihon of a simplified mounting arrangement for an ultrasonic tool.

Another important object of this invention is the provision of an ultrasonic tool mounted for reciprocating motion responsive to fluid pressure, such mounting being characterized by extreme simplicity, accuracy and precision.

A further object of this invention is the provision of an ultarsonic tool adapted to be driven in reciprocating motion, the ultrasonic tool itself forming a part of a fluid-operated piston reciprocating within a cylindrical sleeve.

Further and still other objects of this invention will be more clearly apparent by reference to the following description when taken in conjunction with the accompanying drawings in which:

FIG. 2 is an elevational view, partly in section, of the mounting arrangement of the ultrasonic tool.

Figure 1:
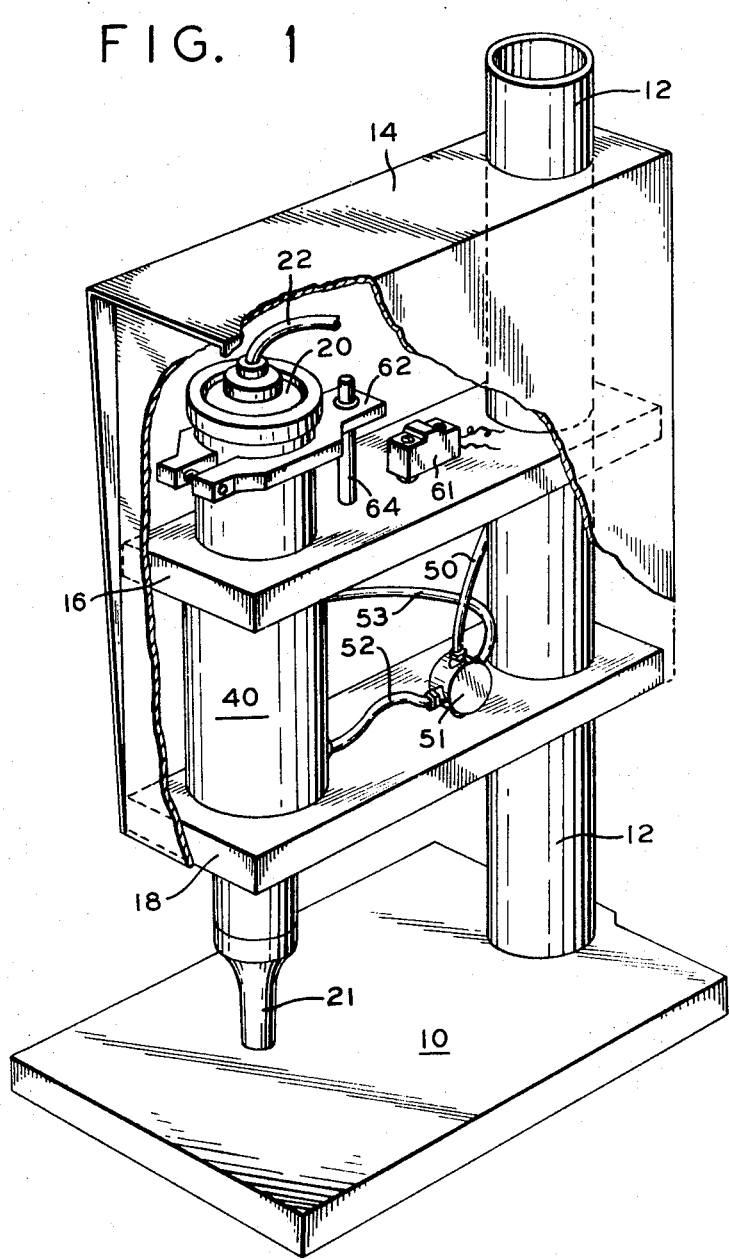
FIG. 1 is a perspective view of the ultarsonic tool with stand.

Referring now to the figures and FIG. 1 in particular, numeral 10 identifiies a platform from which a post 12 extends in upward direction. The ultrasonic tool is enclosed in an enclosure 14 which is attached to two plates 16 and 18 serving as a mounting means. The plates 16 and 18 can be moved in unison and positioned vertically along the post 12 by suitable clamp means (not shown).

Referring now also to FIG. 2, an ultrasonic converter unit 20 is provided with a mechanical amplitude transformer 21, also known as horn, which amplifies the mechanical vibrations generated and which transfers such vibrations by mechanical contact to a workpiece disposed on the platform 10.

The converter unit 20 receives high frequency electrical energy from an electrical generator (not shown) via a flexible cable 22 and connector 23, such energy being fed to an electroacoustic transducing means, e.g. a piezoelectric or magnetostrictive transducer, contained within the converter unit 20 for converting the electrical energy to sonic energy. A typical converter unit of this type is shown and described in U.S. Pat. No. 3,328,610 issued to S. E. Jacke et al. on June 27, 1967 entitled "Sonic Wave Generator." Typically, the converter unit receives electrical energy at a frequency of 20 kHz. and then provides sonic energy of the same frequency, the latter frequency being, of course, in the ultrasonic frequency range. However, it will be apparent that the precise frequency used does not bear upon the following disclosure.

The converter unit 20 is fitted with a surrounding sleeve 30 and is retained in this sleeve by means of a threaded bushing 31 and a snap ring 32 resting in an internal groove of the sleeve 30 and supporting the underside of the converter unit.

The sleeve 30 is provided, moreover, with an annular ring 33 which is fastened to the sleeve 30 by means of a pair of snap rings 34 and 35 which are seated in respective external circular grooves of the sleeve 30. The ring 33 is fitted further with a set of axially spaced O-ring gaskets 36 and a pair of axially spaced bearing and sealing rings 37.

The converter unit 20, sleeve 30 and ring 33 form an assembly and constitute, for all practical purposes, a piston adapted to undergo reciprocating motion within a cylindrical sleeve 40 which is mounted substantially stationary. The underside of the sleeve 40 is seated on a radial surface 19 of the stationary mounting plate 18. The sleeve 40 is urged into such seating by the force exerted by a helical coil spring 41 which is interposed between the radial surface 17 of the stationary upper mounting plate 16 and a first sleeve bushing 42 fastened to the inside surface of the sleeve 40 by means of a snap ring 43 and a resilient bumper 44, all being disposed within an undercut of the sleeve 40. The sleeve bushing 42 includes a bearing surface ring 45 and a set of fluid pressure sealing rings 46 and 47.

Similarly, there is provided at the lower end of the sleeve 40 a second sleeve bushing 42' which is secured to the inside of the sleeve 40 by means of a snap ring 43' and a resilient bumper 44', all being recessed in the sleeve 40. Also, as stated above, the sleeve bushing 42' includes a bearing surface ring 45' and a set of fluid pressure sealing rings 46' and 47'.

A hose 50 adapted to carry fluid is coupled to a source of pressurized fluid, such as compressed air, and to a solenoid controlled valve 51. Hoses 52 and 53 by suitable coupling means and apertures in the sleeve 40 permit fluid to enter or be discharged from the two annular chambers formed respectively by the outer sleeve 40, inner sleeve 30, bushing 42' and ring 33; and the sleeve 40, sleeve 30, bushing 42 and ring 33. When pressurizing the upper chamber via the hose 53, the sleeve 30 with converter unit 20 and ring 33 (acting as piston and piston ring) are driven in a downward direction. The stationary bushings 42 and 42' align the sleeve 30 and provide bearing surfaces for the sliding motion. As the frontal surface of the horn 21 contacts a workpiece on the platform, a reaction force is produced which urges the outer cylindrical sleeve 40 into a limited counter-motion, against the force exerted by the spring 41. The sleeve 40 has coupled thereto an actuator plate 60 which, responsive to such upward motion, operates the actuating push button of a stationary switch 61, the latter being coupled in an electrical circuit which initiates the transfer of electrical power via the cable 22 to the converter unit 20.

When pressurizing the lower chamber via the hose 52 and venting the upper chamber to ambient, the sleeve 30 with converter unit 20 is driven in an upward direction and resumes the position shown. The bumpers 44 and 44' serve to stop the motion of the sleeve 30 and ring 33. The pin 64, retained in bushing 63 and depending from the clamp 62 together with the respective holes in the plates 16 and 60 through which the pin 64 extends, serves to prevent rotation of the converter and surrounding sleeve relative to the stationary platform and post.

It will be seen that the design disclosed hereinbefore provides a simplified mounting arrangement for a source of ultrasonic energy and for reciprocating such source relative to a stationary workpiece. The source moves concentric with the actuating mechanism, hence, eliminating the need for guide rods, sleeve bearings and other mechanical elements which are used to reduce the ever present possibility of misalignment and subsequent freezing.

What is claimed is:

1. An ultrasonic tool and stand comprising in combination:
   a platform having an upstanding post;
   mounting means elevated from said platform supported by said post;
   a substantially stationary cylindrical sleeve supported by said mounting means;
   a movable sleeve disposed within said substantially stationary sleeve, said movable sleeve enclosing and supporting for motion therewith a converter unit which is adapted to receive electrical energy and provide ultrasonic energy to a workpiece disposed on said platform;
   an annular ring disposed about said movable sleeve, said ring being fixed to said movable sleeve and including means for providing a fluid seal between said movable sleeve and said substantially stationary sleeve;
   a pair of sleeve bushings interposed in the radial space between said substantially stationary sleeve and said movable sleeve, said sleeve bushings being arranged to axially straddle said ring and provide at either side of said annular ring a respective annular chamber adapted to be pressurized, and
   means coupled to said stationary sleeve to selectively pressurize said respective chambers for causing reciprocating motion of said ring, movable sleeve and enclosed converter unit relative to said substantially stationary sleeve and said platform.

2. An ultrasonic tool and stand as set forth in claim 1, spring means disposed for urging said substantially stationary cylindrical sleeve in one direction against said mounting means, and said cylindrical sleeve being urged against the force exerted by said spring means responsive to the counter force exerted upon said cylindrical sleeve resulting from said converter unit engaging and being urged into steady contact with a workpiece disposed on said platform.

3. An ultrasonic tool and stand as set forth in claim 2, a switch mounted for being actuated responsive to the counter motion of said cylindrical sleeve.

4. An ultrasonic tool and stand as set forth in claim 1, and means mounted to said movable sleeve enclosing said converter unit for preventing rotation of said sleeve relative to said platform.

5. An ultrasonic tool and stand as set forth in claim 1, and a mechanical amplitude transformer coupled to said converter unit, said amplitude transformer being adapted to engage a workpiece disposed on said platform responsive to the motion of said movable sleeve and converter unit in a direction toward said platform.

6. An ultrasonic tool and stand as set forth in claim 1, said mounting means including a pair of spaced plates.

References Cited
UNITED STATES PATENTS

| | | | |
|---|---|---|---|
| 3,222,239 | 12/1965 | Deans | 156—580 |
| 3,375,965 | 4/1968 | Zaitsen et al. | 228—1 |

SAMUEL FEINBERG, Primary Examiner

J. J. DEVITT, Assistant Examiner

U.S. Cl. X.R.
156—73; 228—1